(12) United States Patent
Van Brocklin et al.

(10) Patent No.: US 7,084,894 B2
(45) Date of Patent: Aug. 1, 2006

(54) OPTICAL DISC DRIVE FOCUSING APPARATUS

(75) Inventors: Andrew L. Van Brocklin, Corvallis, OR (US); Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 10/660,991

(22) Filed: Sep. 12, 2003

(65) Prior Publication Data

US 2005/0057639 A1 Mar. 17, 2005

(51) Int. Cl.
*B41J 2/47* (2006.01)
*G11B 5/58* (2006.01)

(52) U.S. Cl. .................... 347/224; 369/53.23
(58) Field of Classification Search .......... 250/201.2, 250/201.4–201.8, 202; 347/224–225; 360/114.03, 360/114.06; 369/44.27, 44.32, 53.22–53.23, 369/53.28; 396/93
See application file for complete search history.

(56) References Cited

U.S. PATENT DOCUMENTS

| 4,027,217 | A | | 5/1977 | Harman ..................... 388/814 |
| 4,182,563 | A | * | 1/1980 | Biber et al. ................... 396/93 |
| 4,967,286 | A | | 10/1990 | Nomula et al. ............. 386/124 |
| 5,182,741 | A | | 1/1993 | Maeda et al. ............ 369/47.48 |
| 5,398,231 | A | | 3/1995 | Shin et al. ................ 369/275.4 |
| 5,498,509 | A | | 3/1996 | Shin et al. ................... 430/321 |
| 5,608,717 | A | | 3/1997 | Ito et al. ................... 369/275.3 |
| 5,608,718 | A | | 3/1997 | Schiewe ................... 369/275.4 |
| 5,627,895 | A | | 5/1997 | Owaki ......................... 380/54 |
| 5,675,570 | A | | 10/1997 | Ohira et al. ............. 369/275.1 |
| 5,688,173 | A | | 11/1997 | Kitahara et al. .............. 463/29 |
| 5,729,533 | A | | 3/1998 | Marquardt ................... 369/273 |
| 5,745,457 | A | | 4/1998 | Hayashi et al. .......... 369/47.45 |
| 5,748,607 | A | | 5/1998 | Ohira et al. ............. 369/275.4 |
| 5,751,671 | A | | 5/1998 | Koike et al. .................. 369/14 |
| 5,764,430 | A | | 6/1998 | Ottesen et al. ........... 360/73.03 |
| 5,766,495 | A | | 6/1998 | Parette ......................... 216/54 |
| 5,781,221 | A | | 7/1998 | Wen et al. ................... 347/232 |
| 5,846,131 | A | | 12/1998 | Kitahara ....................... 463/29 |
| 5,875,156 | A | | 2/1999 | Ito et al. ................... 369/30.1 |
| 5,915,858 | A | | 6/1999 | Wen ............................ 400/61 |
| 5,949,752 | A | | 9/1999 | Glynn et al. ............. 369/275.3 |
| 5,958,651 | A | | 9/1999 | Van Hoof et al. .......... 430/292 |
| 5,967,676 | A | | 10/1999 | Cutler et al. ................. 400/70 |
| 5,997,976 | A | | 12/1999 | Mueller et al. ............ 428/64.1 |
| 6,019,151 | A | | 2/2000 | Wen et al. ................... 156/387 |
| 6,026,066 | A | | 2/2000 | Maezawa ................ 369/44.28 |
| 6,034,930 | A | | 3/2000 | Kitahara .................. 369/47.15 |
| 6,074,031 | A | | 6/2000 | Kahle ............................ 347/4 |
| 6,102,800 | A | | 8/2000 | Kitahara et al. .............. 463/29 |
| 6,104,677 | A | | 8/2000 | Kirihara et al. ............... 369/14 |
| 6,124,011 | A | | 9/2000 | Kern ......................... 428/64.1 |
| 6,160,789 | A | | 12/2000 | Abraham ................ 369/275.1 |

(Continued)

FOREIGN PATENT DOCUMENTS

JP 2002251862 A 9/2002

(Continued)

*Primary Examiner*—Hai Pham

(57) ABSTRACT

An optical focusing system is configured to generate a data profile, wherein the data profile is configured to provide signals for operation of an actuator. Application of the signals from the data profile results in focus of optics within a label region of an optical disc. An image is printed on the label region of the optical disc while the optics focus on the label region of the optical disc by applying signals to the actuator according to the data profile.

58 Claims, 10 Drawing Sheets

U.S. PATENT DOCUMENTS

| | | | |
|---|---|---|---|
| 6,202,550 B1 | 3/2001 | Lee et al. | 101/38.1 |
| 6,264,295 B1 | 7/2001 | Bradshaw et al. | 347/2 |
| 6,266,305 B1 * | 7/2001 | Buchler | 369/44.32 |
| 6,270,176 B1 | 8/2001 | Kahle | 347/2 |
| 6,295,261 B1 | 9/2001 | Kim | 369/53.3 |
| 6,317,399 B1 | 11/2001 | Ohtani et al. | 369/47.44 |
| 6,384,929 B1 | 5/2002 | Miller | 358/1.15 |
| 6,386,667 B1 | 5/2002 | Cariffe | 347/12 |
| 6,403,191 B1 | 6/2002 | Casagrande | 428/42.2 |
| 6,440,248 B1 | 8/2002 | Mueller | 156/219 |
| 6,452,883 B1 | 9/2002 | Chan | 369/53.14 |
| 6,469,969 B1 | 10/2002 | Carson et al. | 369/59.12 |
| 6,813,226 B1 * | 11/2004 | Kadlec et al. | 369/44.27 |
| 6,829,203 B1 * | 12/2004 | Yonezawa et al. | 369/44.27 |
| 2002/0114230 A1 | 8/2002 | Kadlec et al. | 369/44.29 |
| 2002/0191517 A1 | 12/2002 | Honda et al. | 369/53.29 |
| 2003/0161224 A1 | 8/2003 | Anderson et al. | 369/30.58 |
| 2004/0004912 A1 * | 1/2004 | Morishima | 369/44.32 |

FOREIGN PATENT DOCUMENTS

JP     2003223727 A     8/2003

* cited by examiner

| Actuator Phase Lag Calibration Table 298 ||
|---|---|
| Input Signal Frequency 600 | Phase Lag 605 |
| 2 Hz | $\Phi = +2$ deg |
| 3 Hz | $\Phi = +4$ deg |
| 4 Hz | $\Phi = +6$ deg |
| 5 Hz | $\Phi = +8$ deg |

*Fig. 6A*

| Voltage Data Look-up Table 296 ||||
|---|---|---|---|
| Sector of Disc 615 | 0<r<1" 620 | 1"<r<2" 625 | 2"<r<3" 630 |
| 0-44 deg | $V=V_1, \Phi = \Phi_1$ | $V=V_9, \Phi = \Phi_9$ | $V=V_{17}, \Phi = \Phi_{17}$ |
| 45-89 deg | $V=V_2, \Phi = \Phi_2$ | $V=V_{10}, \Phi = \Phi_{10}$ | $V=V_{18}, \Phi = \Phi_{18}$ |
| 90-134 deg | $V=V_3, \Phi = \Phi_3$ | $V=V_{11}, \Phi = \Phi_{11}$ | $V=V_{19}, \Phi = \Phi_{19}$ |
| 135-179 deg | $V=V_4, \Phi = \Phi_4$ | $V=V_{12}, \Phi = \Phi_{12}$ | $V=V_{20}, \Phi = \Phi_{20}$ |
| 180-224 deg | $V=V_5, \Phi = \Phi_5$ | $V=V_{13}, \Phi = \Phi_{13}$ | $V=V_{21}, \Phi = \Phi_{21}$ |
| 225-269 deg | $V=V_6, \Phi = \Phi_6$ | $V=V_{14}, \Phi = \Phi_{14}$ | $V=V_{22}, \Phi = \Phi_{22}$ |
| 270-314 deg | $V=V_7, \Phi = \Phi_7$ | $V=V_{15}, \Phi = \Phi_{15}$ | $V=V_{23}, \Phi = \Phi_{23}$ |
| 315-360 deg | $V=V_8, \Phi = \Phi_8$ | $V=V_{16}, \Phi = \Phi_{16}$ | $V=V_{24}, \Phi = \Phi_{24}$ |

*Fig. 6B*

OPTICAL DISC DRIVE FOCUSING APPARATUS

BACKGROUND

Optical discs, such as compact discs (CD) and digital versatile discs (DVD) are a form of computer readable media which provide extensive storage for digital information. While some optical discs may be read-only, others may additionally be written-to. Typically, one side of the disc is referred to as the data side and the other side of the optical disc is referred to as the label side. The label side may include factory-prepared label text and graphics.

An optical disc drive (ODD) of a computer is used to read from, and in certain cases to write to, the data side of an optical disc. An optical pickup unit (OPU), included within the optical disc drive, is configured with a laser and sensors adapted for reading, and possibly writing, data. Various ODDs and OPUs are available, and are manufactured to specifically read and write to the data side of optical discs.

Using emerging technology, the OPU assembly may be is used to define an image on the label surface of an optical disc configured for such a labeling process. However, during the labeling process conventional focusing systems used within the OPU assembly will not work properly. A number of reasons exist for this failure. First, known OPU assemblies in ODDs are designed to focus light through a layer of clear polycarbonate, onto a data track defined on top of the layer. As a result, the optics in known OPUs are designed to compensate for refraction resulting from light passage through the polycarbonate. In contrast, when marking the label surface, light must be focused directly onto the top of the label surface, and does not pass through any layer of transparent material. Accordingly, the corrections built into the optics which cancel the refraction resulting from light travel through the polycarbonate present a problem when attempting to focus existing OPUs on a label surface.

A second reason for the difficulty encountered in focusing light on the label surface of a disc is that conventional OPUs, which are configured to focus light through the polycarbonate, are effectively designed to focus light at a distance which is greater than the distance to the surface of the disc. Accordingly, to focus on the surface of the disc, signals sent to the optics must be reconfigured to focus at the surface of the disc, rather than at a more distant location, such as the data track within the disc.

A third reason for the difficulty encountered in focusing light on the label surface of the disc is that conventional OPUs are configured to focus on data pits defining a data track, which is typically backed by a reflective covering of aluminum. This reflective covering provides a very smooth and uniformly reflective surface, which reflect laser light uniformly. Sensors which detect the reflected light tend to have a very high signal-to-noise ratio. In contrast, light is not uniformly reflected off the label surface of the disc, and the sensors which detect this reflected light have a very low signal-to-noise ratio.

Accordingly, the need exists for new and improved systems and methods to control focal optics within optical disc drives.

SUMMARY

An optical focusing system is configured to generate a data profile, wherein the data profile is configured to provide signals for operation of an actuator. Application of the signals from the data profile results in focus of optics within a label region of an optical disc. An image is printed on the label region of the optical disc while the optics focus on the label region of the optical disc by applying signals to the actuator according to the data profile.

BRIEF DESCRIPTION OF THE DRAWINGS

The following detailed description refers to the accompanying figures. In the figures, the left-most digit(s) of a reference number identifies the figure (Fig.) in which the reference number first appears. Moreover, the same reference numbers are used throughout the drawings to reference like features and components.

FIG. 6A is a block diagram illustrating an exemplary calibration table.

FIG. 6B is a block diagram illustrating an exemplary input voltage look-up table.

DETAILED DESCRIPTION

Overview

The following discussion is directed to systems and methods for providing signals to focusing optics within an optical disc drive to facilitate optical disc labeling. By measuring a variety of locations on the disc, a data profile, such as a table or a function, may be created associating a variety of locations on the disc with data, such as a voltage for transmission to an actuator to maintain focus on a label surface of the disc. Accordingly, the label surface of the disc may be kept in focus while a label is printed by applying the appropriate voltages (or current, etc.) to the actuator (e.g. a voice coil motor) to place the OPU optics (e.g. objective lens) in proper focus while compensating for an irregular disc surface.

Exemplary System Environment

Figure 1:
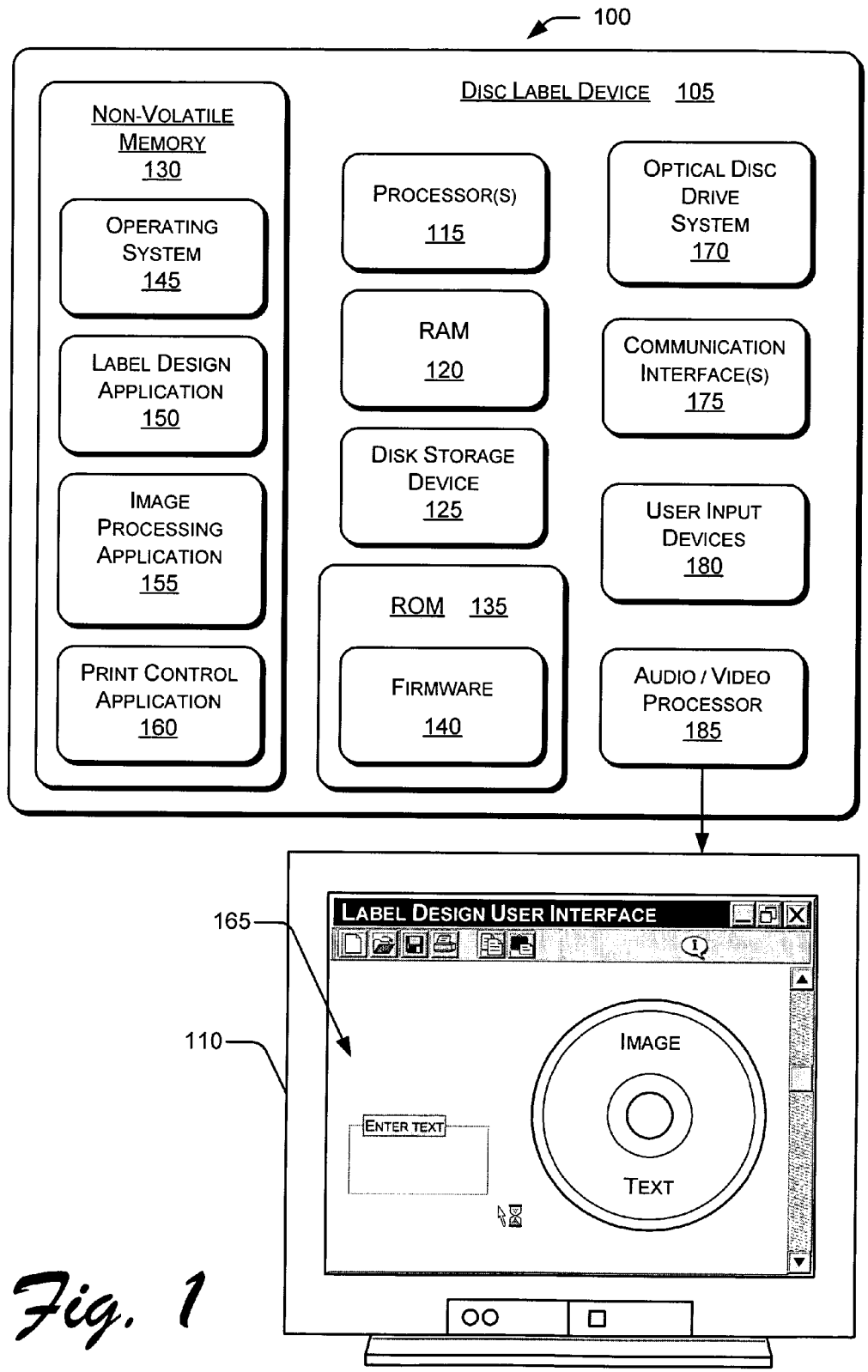
FIG. 1 is a block diagram illustrating an exemplary disc media marking system for measuring and calibrating input voltage values to control an actuator for operation of focal optics.

FIG. 1 shows an exemplary disc media marking system 100 suitable for measuring and calibrating input voltage values of an actuator. The marking system 100 includes a disc media marking device 105 and a display device 110. The disc media marking device 105 may be implemented as a stand-alone appliance device for labeling disc media. Alternatively, the disc media marking device 105 may be integrated as part of an optical media player or drive, such as a writable compact disc (CD) player which is implemented to label an optical disc as well as record data onto a CD-R (CD recordable disc) and/or a CD-RW (CD-rewritable disc). Such writable CD devices may include, for example, a stand-alone audio CD player which is a peripheral component in an audio system, a CD-ROM drive integrated as standard equipment in a PC (personal computer), a DVD (digital versatile disc) player, and any number of similar embodiments.

Disc media marking device 105 includes one or more processors 115 (e.g., any of microprocessors, controllers, and the like) which process various instructions to control the operation of disc media marking device 105 and communicate with other electronic and computing devices. Disc media marking device 105 may be implemented with one or more memory components, examples of which include a random access memory (RAM) 120, a disc storage device 125, and non-volatile memory 130 (e.g., any one or more of a read-only memory (ROM) 135, flash memory, EPROM, EEPROM, etc.).

Disc storage device 125 may include any type of magnetic or optical storage device, such as a hard disc drive, a magnetic tape, a recordable and/or rewriteable compact disc (CD), a DVD, DVD+RW, and the like. The one or more memory components provide data storage mechanisms to store various information and/or data such as configuration information for disc media marking device 105, graphical user interface information, and any other types of information and data related to operational aspects of disc media marking device 105. Alternative implementations of disc media marking device 105 may include a range of processing and memory capabilities, and may include any number of differing memory components than those shown in FIG. 1.

Disc media marking device 105 includes a firmware component 140 which is implemented as a permanent memory module stored on ROM 135, or with other components in disc media marking device 105, such as a component of a processor 115. Firmware 140 is programmed and distributed with disc media marking device 105 to coordinate operations of the hardware within disc media marking device 105 and contains programming constructs used to perform such operations.

An operating system 145 and one or more application programs may be stored in non-volatile memory 130 and executed on processor(s) 115 to provide a runtime environment. A runtime environment facilitates extensibility of disc media marking device 105 by allowing various interfaces to be defined that, in turn, allow the application programs to interact with disc media marking device 105. In this example, the application programs include a label design application 150, an image processing application 155, and a print control application 160.

The label design application 150 generates a label design user interface 165 for display on display device 110 from which a user may create a label image to be rendered on a disc media, such as on an optical disc. A user may specify, or otherwise drag and drop text, a bitmap image for background, a digital photo, a graphic or symbol, and/or any combination thereof to create the label image on the user interface 165.

The image processing application 155 processes the label image created with the label design user interface 165 to produce a data stream of label image data and laser control data to control rendering the image on concentric circular tracks of a disc media (i.e., an optical disc). For example, a continuous tone RGB (red, green, and blue) rectangular raster graphic of the label image may be converted to concentric circular tracks. The curved raster is color mapped and separated into the printing color channels KCMY (black, cyan, magenta, and yellow), or grayscale. This data stream is formatted as laser control data and is augmented with other control commands to control the disc media marking device 105 rendering a label on the disc media.

A label file is generated which may be communicated to a controller where the label file is parsed to control a labeling mechanism. Alternatively, the concentric circular tracks may be generated and streamed to the disc media marking device 105 one track at a time to utilize host processing with the device's rendering process.

The print control application 160 determines the radius of the first track and the subsequent track spacing. After the radius of the first track and the track spacing is determined, the print control application 160 determines which label image data will correspond to each respective track. The laser mark locations along a particular track are specified in a coordinate system where the concentric circular tracks are defined in coordinates of the radial distance and the distance along each respective track.

Disc media marking device 105 includes an optical disc drive (ODD) system 170 which may be implemented to mark on a surface of a disc media (i.e., optical disc), such as to render a label image on a label surface (i.e., label side) of an optical disc. The ODD system 170 is described in greater detail herein below with reference to FIG. 2.

Disc media marking device 105 further includes one or more communication interfaces 175 which may be implemented as any one or more of a serial and/or parallel interface, as a wireless interface, any type of network interface, and as any other type of communication interface. A wireless interface enables disc media marking device 105 to receive control input commands and other information from an input device, such as from a remote control device or from another infrared (IR), 802.11, Bluetooth, or similar RF input device. A network interface provides a connection between disc media marking device 105 and a data communication network which allows other electronic and computing devices coupled to a common data communication network to send label image data and other information to disc media marking device 105 via the network. Similarly, a serial and/or parallel interface provides a data communication path directly between disc media marking device 105 and another electronic or computing device.

Disc media marking device 105 may include user input devices 180 which may include a keyboard, pointing device, selectable controls on a user control panel, and/or other mechanisms to interact with, and to input information to disc media marking device 105. Disc media marking device 105 also includes an audio/video processor 185 which generates display content for display on display device 110, and generates audio content for presentation by a presentation device, such as one or more speakers (not shown). The audio/video processor 185 may include a display controller which processes the display content to display corresponding images on display device 110. A display controller may be implemented as a graphics processor, microcontroller, integrated circuit, and/or similar video processing component to process the images. Video signals and audio signals may be communicated from disc media marking device 105 to display device 110 via an RF (radio frequency) link, S-video link, composite video link, component video link, or other similar communication link.

Although shown separately, some of the components of disc media marking device 105 may be implemented in an application specific integrated circuit (ASIC). Additionally, a system bus (not shown) typically connects the various components within disc media marking device 105. A system bus may be implemented as one or more of any of several types of bus structures, including a memory bus or memory controller, a peripheral bus, an accelerated graphics port, or a local bus using any of a variety of bus architectures. Furthermore, disc media marking device 105 may share a system bus with a host processor.

Exemplary ODD Embodiment

Figure 2:
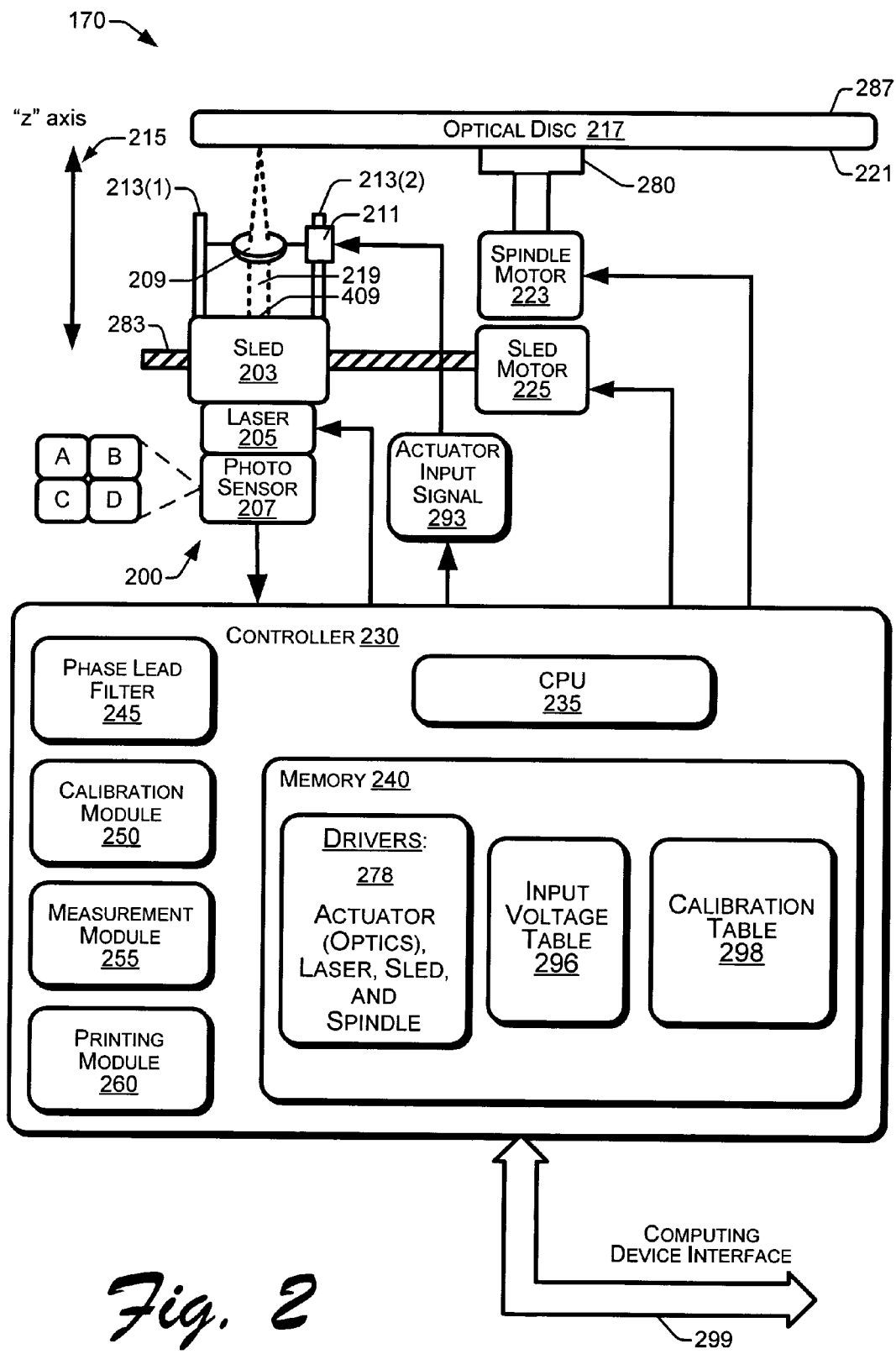
FIG. 2 is a block diagram illustrating an exemplary optical disc drive system.

FIG. 2 shows an exemplary embodiment of the ODD system 170 shown in FIG. 1. The ODD system 170 comprises an optical pickup unit (OPU) assembly 200 that includes a sled 203, a laser 205, a photo sensor 207, an objective lens or optics 209, and an actuator 211. The actuator 211 responds to an input voltage (or current) to cause the optics 209 to move the focal point.

For purposes of illustration, the optics 209 are carried by lens supports 213(1), 213(2). The optics 209 are configured for travel (i.e. adjustment of the focal point) along a "z" axis 215 perpendicular to an optical disc 217.

A laser beam 219 is generated by the laser 210 and shown onto (reflected on) a label side surface 221 of optical disc 217. The laser beam 219 creates laser marks that correspond to label image data to render an image of the label side of the optical disc 217.

The ODD system 170 includes a spindle motor 223, a sled motor 225, and a controller 230. In general, controller 230 may be implemented as a printed circuit board employing a combination of various components discussed above with respect to the disc media marking system 100 of FIG. 1. Accordingly, controller 230 includes a processor 235 for processing computer/processor-executable instructions from various components stored in a memory 240. Processor 235 is typically one or more of the processors 115 discussed above with respect to the disc media marking system 100 of FIG. 1. Likewise, memory 240 is typically the non-volatile memory 130 and/or firmware 140 of disc media marking system 100 of FIG. 1.

Controller 230 further includes a phase lead filter 245, a calibration module 250, a measurement module 255, and a printing module 260.

Drivers 278, including a laser driver, sled driver, and spindle driver are stored in memory 240 and executable on processor 235. Although these components are represented in the FIG. 2 embodiment as software components stored in memory 240 and executable on processor 235, they may also be implemented as firmware or hardware components.

In general, a spindle driver drives the spindle motor 223 to control a rotational speed of optical disc 217 via a spindle 280. The spindle driver operates in conjunction with a sled driver which drives the sled motor 225 to control coarse radial positioning of OPU assembly 200 with respect to disc 217 along a sled drive mechanism 283. In a focus position measurement implementation, the sled 205 of the OPU assembly 200 is moved along the sled drive mechanism 283 to various radii positions of optical disc 217.

In a label surface marking implementation, the rotational speed of disc 217 and the radial position of OPU assembly 200 are controlled such that laser marks are written on the disc 217 as the label side surface 221 moves past the laser beam 219 at a constant linear velocity.

A laser driver controls the firing of laser beam 219 to write laser marks corresponding to a label image onto the label side surface 221. Additionally, the laser driver controls the intensity of the laser beam 219 to read data maintained on the data side 287 of the optical disc 217 when the disc is positioned such that the data side 287 passes over the laser beam 219. In certain cases, the same side is used for data and labeling.

Photo sensor 207 provides laser focus feedback to the laser driver. In this example, photo sensor 207 is comprised of four individual sensor quadrants; quadrants A, B, C, and D. Quadrants A, B, C, and D are configured to measure reflected light independent of one another. In particular, voltage is measured by the quadrants A, B, C, and D. When the sum of measured voltage of the quadrants A, B, C, and D are at a relative maximum, it is an indication that the objective lens is at a location on the "z' axis that places the laser beam in focus.

Furthermore, photo sensor 207 may be configured to the controller 230, where photo sensor 207 allows the controller 230 to recognize patterns on the optical disc 217 as it rotates. This pattern recognition is further discussed below.

A driver for actuator 211 is included among the drivers 278. The actuator driver is executable on processor 235 to adjust an actuator input signal source 293 which provides an input to actuator 211. Actuator driver further accounts for any offset values to compensate for different rates of sweeping of OPU assembly 200 as performed by actuator 211. Furthermore, the actuator driver may allow for a DC voltage offset. As discussed further below, the DC voltage offset is used to provide consistent time period of in focus measurement per particular sweeping frequency during a calibration implementation. For each sweeping frequency there is a DC voltage offset that provides that in focus takes place consistently per a particularly time period. The DC voltage offset may be a delay or advance in the voltage cycle.

In one implementation of the data profile, a voltage data look-up table 296 is configured to store input voltages that are provided to source 293. When source 393 is voltage source, table 296 stores DC voltage offset values to compensate for and particular to specific sweeping frequencies. Furthermore, table 296 stores particular locations on an optical disc corresponding to appropriate input voltage, sweeping frequency, and offset that allow the OPU optics or objective lens 209 to be placed in proper focus. Table 296 is further discussed below. A calibration table 298 is further included to provide, create, and store offsets values that are determine in a calibration procedure, where the offset values are particular to sweeping frequencies.

Figure 3:
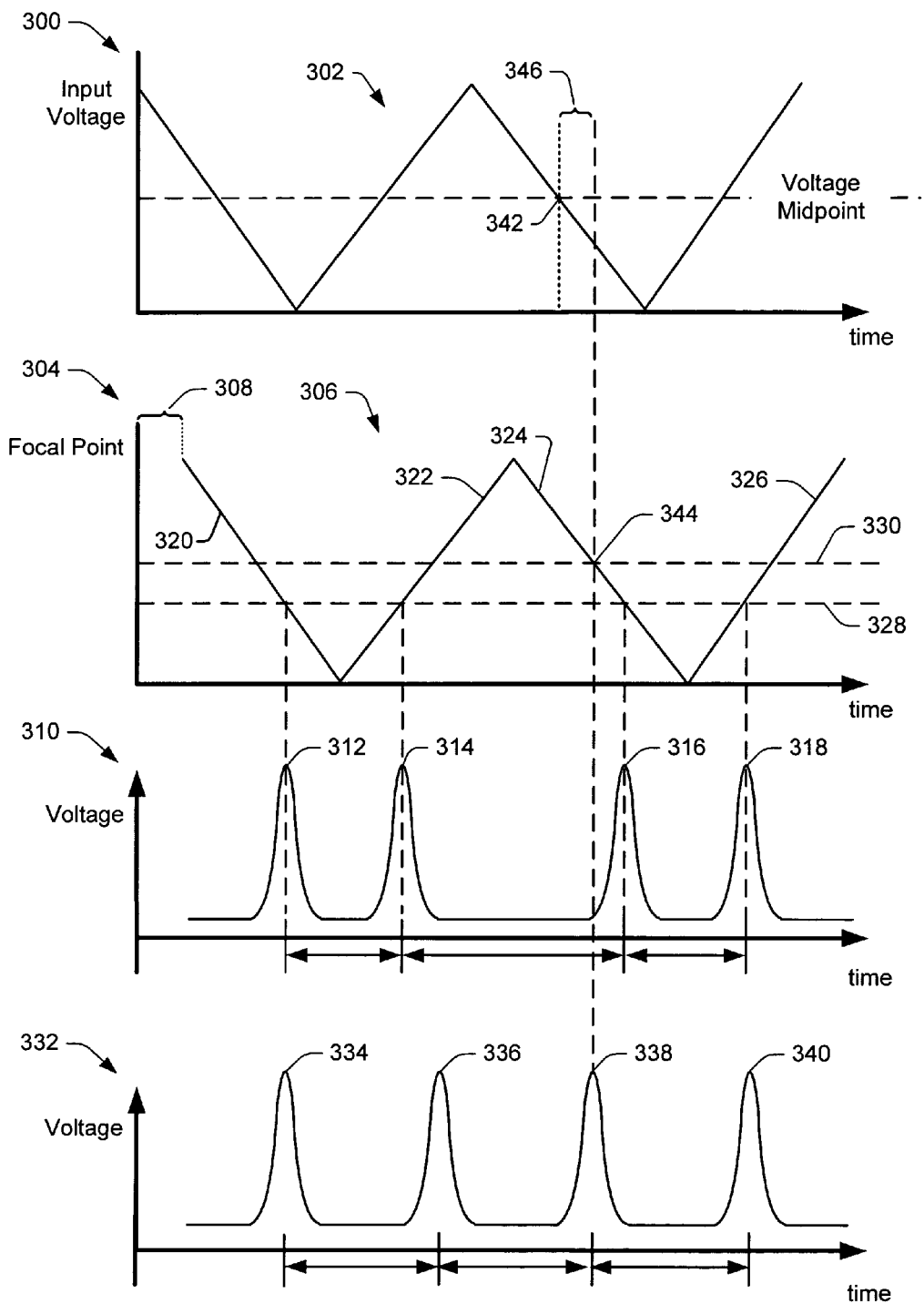
FIG. 3 illustrates various timeline curves that describe calibration for phase delay of input voltage to an actuator.

Computing device interface 299 interfaces the controller 230 of the ODD system 170 with another electronic or computing device to receive label image data or a label file (not shown). The computing device interface 299 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disc drive. ATAPI devices generally include CD-ROM drives, CD-recordable drives, CD-rewritable drives, DVD (digital versatile disc) drives, tape drives, super-floppy drives (e.g., ZIP and LS-120), and the like. Operation Calibration Implementation FIG. 3 shows timeline curves used in calibrating a phase delay of the actuator 211 which controls the focal position of the optics 209. The phase delay is typically measured in degrees with respect to an AC signal, and represents a phase delay between application of the AC signal to the actuator 211 and an associated response in the focal point of the optics 209. The calibration may be performed while an optical disc is spinning or stationary, and may be performed when the sled 203, optics 209 and laser 205 are at any desired radial distance from the center of the optical disc. Where the disc is stationary, the calibration process may be more accurate, since variations in the disc will not result in error in the calibration calculation.

In some applications, since phase delay is influenced by the frequency of the AC component of the voltage applied to the actuator 211, it may be desirable to calibrate the phase delay of the actuator 211 for a variety of frequencies. A calibration phase shift for the actuator 211 for several frequencies may be useful. To see why this is the case, we note that in FIG. 10 a method of printing an image on an optical is described, wherein the optical disc is spun more rapidly when inner portions of the disc are printed and more slowly when outer portions of the disc are printed, thereby maintaining a constant linear speed. Accordingly, a higher-frequency AC signal may be provided to the actuator 211 when some portions of the disc are printed and a lower-frequency AC signal may be provided to the actuator 211 when other portions of the disc are printed. Accordingly, it can be beneficial to calibrate the actuator at both lower and higher frequencies, to discover the delay between signal and response at both lower and higher frequencies.

Referring to graph 300 of FIG. 3, waveform 302 represents the AC component of a composite AC and DC signal which may be applied to the actuator 211 (FIG. 2). Accordingly, the waveform 302 drives the focal optics 209 (FIG. 2) back and forth through a subset of the focal range of the optics 209. Where the AC component rides on a DC component of appropriate magnitude, the actuator 211 drives the focal optics 209 alternately into and out of focus on a surface, such as the disc surface 221. While a triangle wave 302 is illustrated, any AC signal could be used.

Referring to graph 304 of FIG. 3, waveform 306 represents the distance between the focal point of the optics 209 and a fixed location 409, such as the origin of the laser beam (FIG. 2). The waveform 306, showing the focal point resulting from positioning of the optics 209, tracks (i.e. follows or responds to) the waveform 302, which represents the input signal given to the actuator 211 (FIG. 2) which controls the location of the optics 209. Note that the input signal 302 to the actuator leads the focal point waveform 306 in phase. The degree to which the input signal 302 leads the movement of the actuator 211 and optics 209, for a given frequency of the input signal 302, is measured during a calibration process, as will be seen. The phase angle by which the actuator lags behind the input signal 302 is seen at 308, and is typically expressed in degrees or as a time delay. By measuring this phase lag, better control over the actuator is possible. Accordingly, the phase lag may be determined, as seen below.

Graph 310 of FIG. 3 expresses the output of the SUM signal from the quad sensor 207 (FIG. 2) The SUM signal peaks 312–318 indicate that the focal optics passes through the focal point once during each movement 320–326 of the optics; i.e. as the optics moves out and back, it is momentarily in focus once each direction. Note that the distance between all of the SUM peaks 312–318 is not the same. This is because the DC component of the waveform 302 is such that the focal point is somewhat nearer one end or the other of the travel path of the actuator 211 and optics 209. That is, the focal point is nearer one end of the range over which the optics focuses than the other end. More particularly, it can be seen that vertical lines extending from the SUM signal peaks 312–318 intersect the graphical description of the actuator movement 320–326 along line 328. Thus, line 328 indicate the point in each line segment 320–326 wherein the optics is in focus. The line 328 is offset from a line 330 representing a center-line of the travel path of the optics. This offset may be removed by adjusting the DC component of the signal 302 supplied to the actuator. That is, by changing the range over which the optics focuses periodically, the optics may be made to come into focus at the middle of that range. Thus, where the DC offset applied to signal 302 is correctly adjusted, the line 330 will indicate the point in each line segment 320–326 wherein the optics is in focus.

Graph 332 of FIG. 3 shows the four SUM signal peaks 334–340 separated by a uniform distance. This resulted by adjustment of the DC component to the signal 302 applied to the actuator 211. That is, since the actuator 211 moves the optics 209 back and forth along a focal range, by adjusting the DC component applied to the actuator 211, the optics may be made to come into focus at the center of that range. The evenly spaced SUM peaks 334–340 result when the DC component to signal 302 is correctly adjusted.

The phase lag of the actuator can be determined by observing the lag time between one of the SUM peaks and the signal applied to the actuator 211 (FIG. 2) which caused that SUM peak. For example, SUM peak 338 is directly below the mid point of actuator 211 and optics movement 324. However, the voltage that resulted in the actuator 211 being at the midpoint of it travel range is voltage 342. Voltage 342 is separated from actuator location 344 by time 346. Since the time 346 is known, the phase lag of the actuator 211 can easily be determined. Accordingly, the actuator 211 has been calibrated (i.e. phase lag determined) for the frequency of the signal 302.

The actuator 211 can also be calibrated for additional frequencies, as needed. FIG. 6A indicates a more detailed view of the calibration table 298 of FIG. 2 wherein the actuator 211 has been calibrated for four frequencies, ranging from 2 to 5 Hz. For each frequency, a phase shift corresponding to a lag time associated with the operation of the actuator is shown. In an optional feature, the location on the disc wherein the calibration was performed may be recorded. As seen above, the actuator may be calibrated with the disc stationary, or in some cases, with the disc moving.

Figures 4A, 4B:
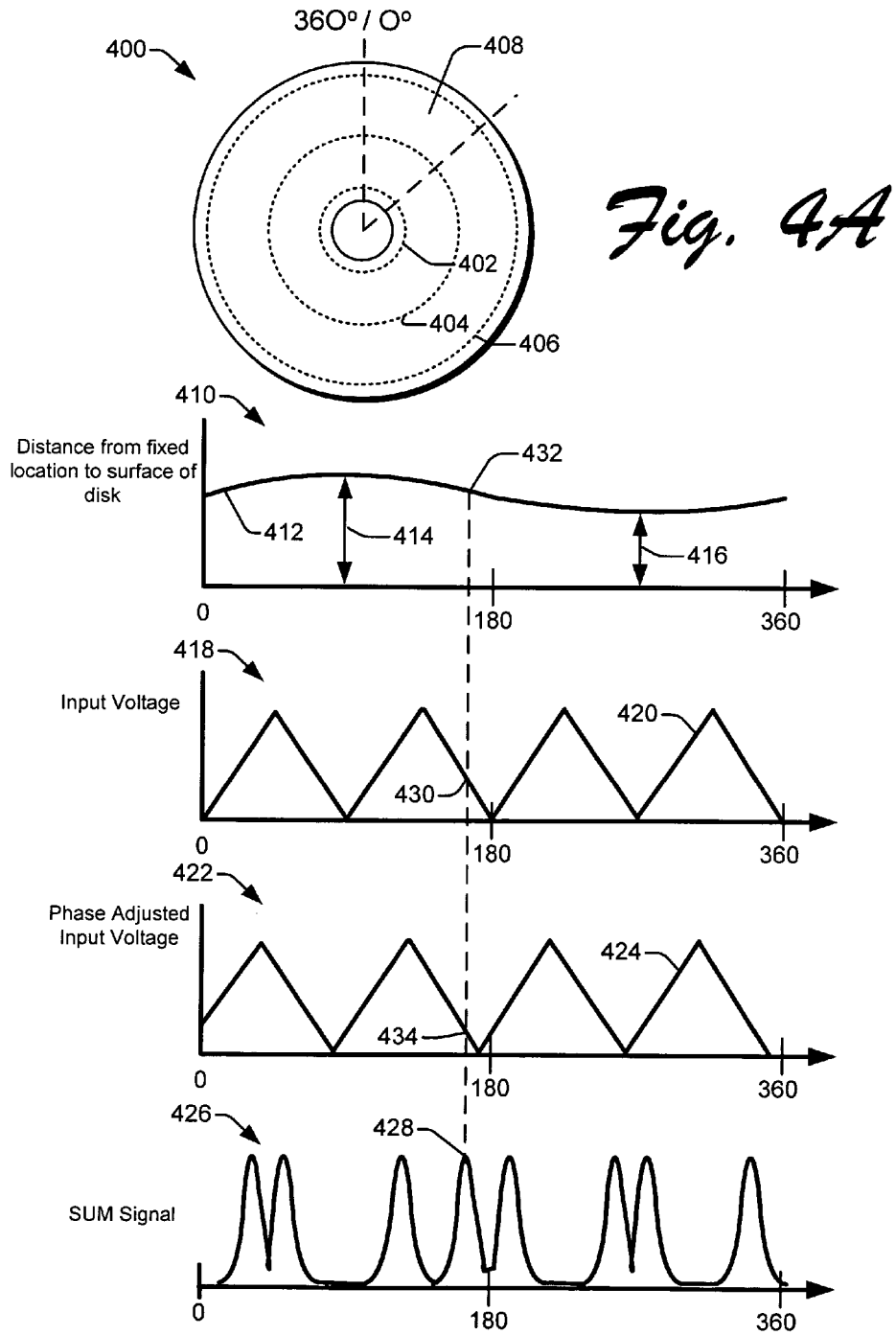
FIG. 4A is a block diagram illustrating various locations on an optical disc where focus measurements may be made to determine contour variances of the optical disc.
FIG. 4B illustrates various curves associated with relative measurements, focus positions, and input voltages plotted against angular orientation of an optical disc used in measurement of an optical disc.

FIG. 4A shows various locations on the label region 400 of an optical disc where focal measurements may be made. Using the focal measurements, the look-up table of FIG. 6B may be generated. Using the look-up table of FIG. 6B, having actuator voltage input information associated with a number of locations on the disc, the optics 209 may be kept in focus while applying an image to the surface 221 (FIG. 2) of an optical disc. Optical disc 400 illustrates exemplary locations wherein focal measurements may be made, i.e. exemplary locations wherein an actuator input voltage which will result in actuator focus. Measurements may be made at various radial distances within the optical disc 400. For example, measurements yielding voltage levels required to cause the actuator 211 to focus the optics 209 may be made at an inner radial location 402, an intermediate radial location 404, and an outer radial location 406.

For each particular radius position, a measurement may be made for any number of sectors of the disc. In an exemplary implementation, the disc is divided into eight sectors (wherein an exemplary sector 408 is illustrated). A zero reference point is established, where zero and 360 degrees are the same point.

FIG. 4B shows an exemplary implementation for generating a voltage data look-up table 298 (FIG. 2) wherein the voltage data look-up table provides voltage levels for operation of an actuator which result in focus of the optics on a plurality of locations within a label region of an optical disc. Graph 410 includes a curve 412 which shows an exaggerated curvature of a surface 221 (FIG. 2) of a disc 217 (FIG. 2). In particular, curve 412 shows how the distance from a fixed location—such as the tip 409 of the laser (i.e. the tip of the laser device generating beam 219)—to the surface 221 of the disc 217 can vary as the disc rotates over 360 degrees. For example, the disc is a greater distance 414 from the fixed location 286 after turning approximately 90 degrees, and a lesser distance 416 turning 270 degrees.

Graph 418 illustrates an AC component of an input voltage which may be applied to the actuator 211. Four triangle waves 420 ramp voltage into the actuator 211 to cause the optics 220 to pass through a focal range eight times, resulting in eight SUM signal peaks indicating that the optics are in focus eight times per revolution. Eight SUM peaks are typically necessary to create the look-up table 298 (FIG. 2), and additional SUM peaks, resulting from a greater AC frequency in the signal 418 input to the actuator 211, is advantageous.

Graph 424 illustrates triangle waves 424 forming an AC component of an input voltage having a phase shift according to calibration of the actuator 211, such as according to the discussion of FIG. 3.

Graph 426 illustrates eight SUM peaks, associated with the four triangle waves. Each SUM peak is a local maximum of the data coming from the SUM sensor 207 (FIG. 2). Each SUM peak is associated with an input voltage with was sent to the actuator, and which resulted in the SUM peak. For example, SUM peak 428 is associated with a voltage 430 in graph 418. Accordingly, when the voltage associated with location 430 was applied to the actuator 211, when the disc was oriented at approximately 170 degrees, the optics were focused on point 432 on the surface 211 (FIG. 2) of the disc 217 (FIG. 2).

However, because graph 418 is phase-adjusted for the phase lag of the actuator 211, a voltage level which compensates for the phase lag of the actuator can be associated with SUM peak 428. Voltage 434 may be slightly more accurate than voltage level 430, because graph 422 is phase-adjusted for the phase lag of the actuator.

Figure 5:
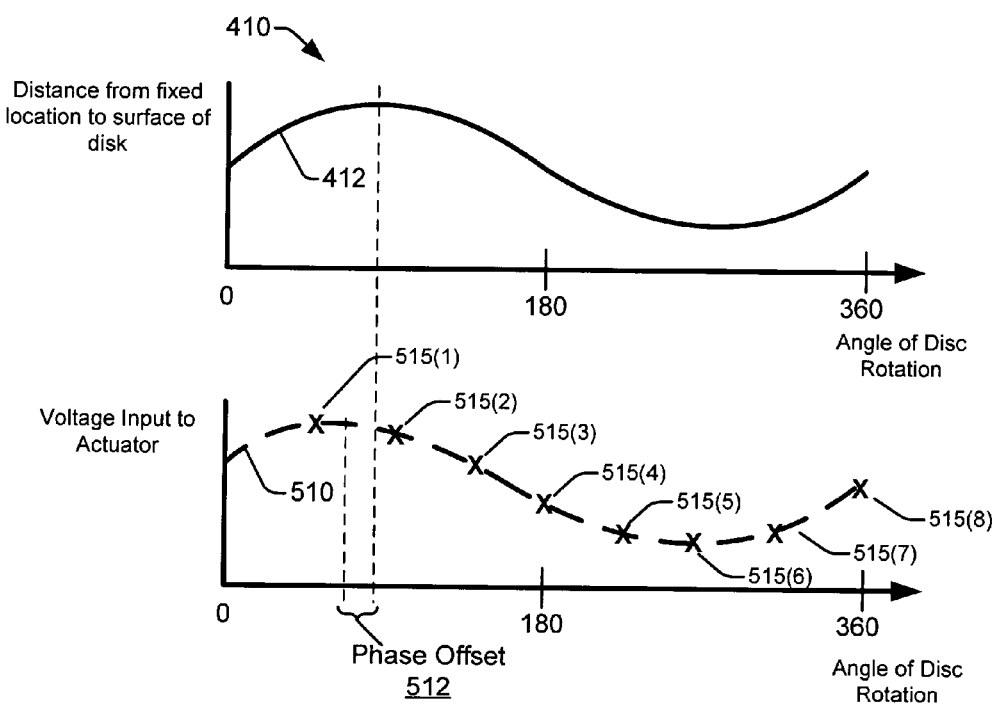
FIG. 5 illustrates relative measurement of an optical disc at various angular positions and an associated input voltage curve to place optics at particular positions during a labeling procedure.

FIG. 5 replicates the curve 410 of FIG. 4, showing the distance from a fixed location to an annulus defined on the surface of a disc over 360 degrees of rotation. Below the curve 410 is a further exemplary implementation of the data profile, including an exemplary piece-wise continuous function 510 wherein the voltage levels which resulted in the SUM peaks are seen at 515(1) through 515(8). Between the points 515 of the curve 510 are interpolated voltage values. The values may be interpolated by a first order linear function, a second order quadratic function or any other desired technique. For example, the any desired point on the curve 510 may be calculated by operation of a Fourier series, a polynomial series or similar technique.

Curve 510 may include a phase offset value 512 equivalent to phase delay 346 (FIG. 3) to account for the inherent lag of the movement of actuator 211 and optics 220 in response to input voltage.

FIG. 6A shows calibration table 298. The calibration table associates a frequency of an AC component of a signal applied to the actuator with a phase offset. This data may be obtained according to the discussion of FIG. 3. The calibration table 298 may be included as part of memory 298 as shown in FIG. 2. The calibration table 298 includes a sweep frequency column 600 and a degree offset column 605. Sweep frequency values are particular to measurement locations on the optical disc as represented in column 610 and have particular offset values represented by $\phi$, which corresponds to a calculated phase offset performed in calibration and used in measurement procedures. Values of column 605 are determined from the calibration procedure described above.

FIG. 6B shows an implementation of a data profile configured as a voltage data look-up table 296. The voltage data look-up table 296 may be included as part of memory 298 as shown in FIG. 2. An optical disc may be logically segmented into sectors, as illustrated in FIG. 4A. Typically, eight or more sectors are defined. As illustrated in table 296, column 615 defines particular sectors of the optical disc, and specifically segments the optical disc into 8 sectors. Each sector comprises 45 degrees of the 360 degrees that represent the optical disc. Each sector is further defined by a radial position from the optical disc's hub. Column 620 represents an inner radial position. Column 625 represents a middle radial position. Column 630 represents an outer radial position.

In the measurement procedure described above, a voltage and phase delay $\phi$ may be calculated for each particular sub-sector as defined by an angular disc sector (i.e., column 615), and further defined by radial position (i.e., columns 620, 625, and 630). At each cell entry shown in table 296 a particular voltage value "V" is provided that drives the actuator to a focus position and may include a phase delay $\phi$. The cell values are derived from the measurement procedure described above.

Voltage values of adjacent cells may be averaged to arrive at an intermediate value for a position between the adjacent cells. For example, a voltage value at a particular radius position may be averaged with a voltage value of a cell at an adjacent radius position, where the cells share the same disc sector as represented by column 615 (i.e., going across a row cell position). Alternatively, a voltage position at a particular sector value may be averaged with a voltage of cell at an adjacent sector value, where the cells share the same radius position (i.e., going up/down columns 620, 625 or 630 cell positions).

When applying compensation, a circuit such as digital phase lead filter may be used. Referring now to FIG. 2, phase lead filter 245 is shown as included in controller 235. The phase lead filter 245 may be implemented in hardware, firmware, and/or software. As input voltage is driven into voltage source 293, the phase lead filter 245 adjusts for phase delay $\phi$.

Focus Peaks

Peaks 310 may be calculated based on a relative maximum amount of light measured by photo sensor 215 of FIG. 2. When photo sensor 207 measures a maximum of light, in focus situations exist. Photo sensor 207 may be overly sensitive at a center of in focus, therefore measurement may be made at the sides of the center, and the measured times average to arrive at a center point.

Alternatively to a photo sensor measuring the light, in focus determination may be made by controller 230 of FIG. 2 recognizing a pattern on an optical disc. Photo sensor 207 or other component of an optical pickup unit may be configured to controller 230 allowing controller 230 to recognize a pattern on the optical disc.

Figure 7:
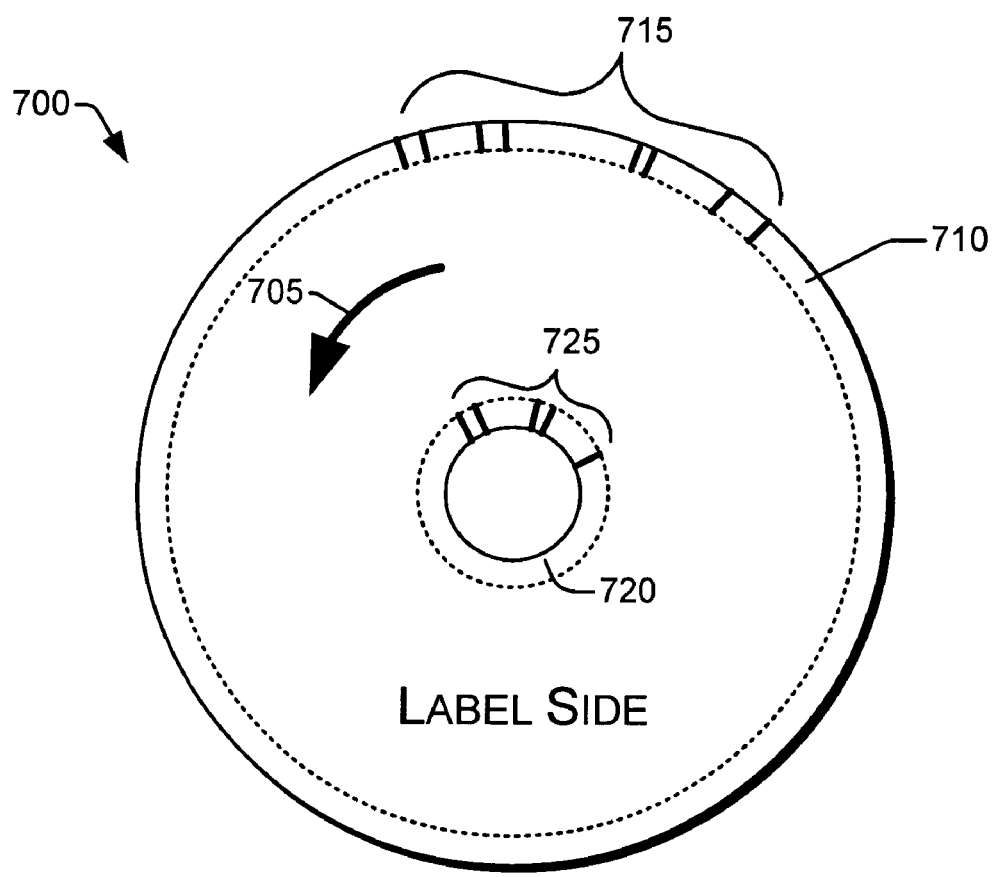
FIG. 7 is a block diagram illustrating an optical disc with exemplary patterns that are recognizable when a laser beam is in focus.

FIG. 7 shows an optical disc 700 with a recognizable pattern. The label side of optical disc 700 is particular marked to allow a controller of an ODD to recognize the pattern when the optical disc is spun and the OPU objective lens is in focus. Disc 700 may have clear coating on its surface, and the pattern may be marked inside the clear coating; however it is contemplated that the pattern is read at the surface of the clear coating where marking implementation is performed.

Optical disc 700 is spun in a counter clockwise direction as indicated by arrow 705. An outer diameter section 710 of optical disc 700 is marked with a pattern 715. In this example, a spoke pattern is shown and may populate the entirety of outer diameter section 710. Likewise an inner diameter section 720 is marked with a spoke pattern 725 which may populate the entirety of inner diameter section 720.

As optical disc 700 is spun, spoke patterns 715 and 725 are read if an objective lens such as objective lens 209 of FIG. 2 is in focus. OPU 200 of FIG. 2 may be placed over either outer diameter section 710 to read spoke pattern 715, or placed over inner diameter section 720 to read spoke pattern 725.

Objective lens 209 is swept by actuator 211, and spoke patterns 715 and 725 come into and out of focus (i.e. read by controller 230 of FIG. 2). Typically, a square wave is seen at controller 230 of FIG. 2 when the spoke patterns 715 and 725 are read. When out of focus situations exist, no pattern or signal is seen at controller 230.

Figure 8:
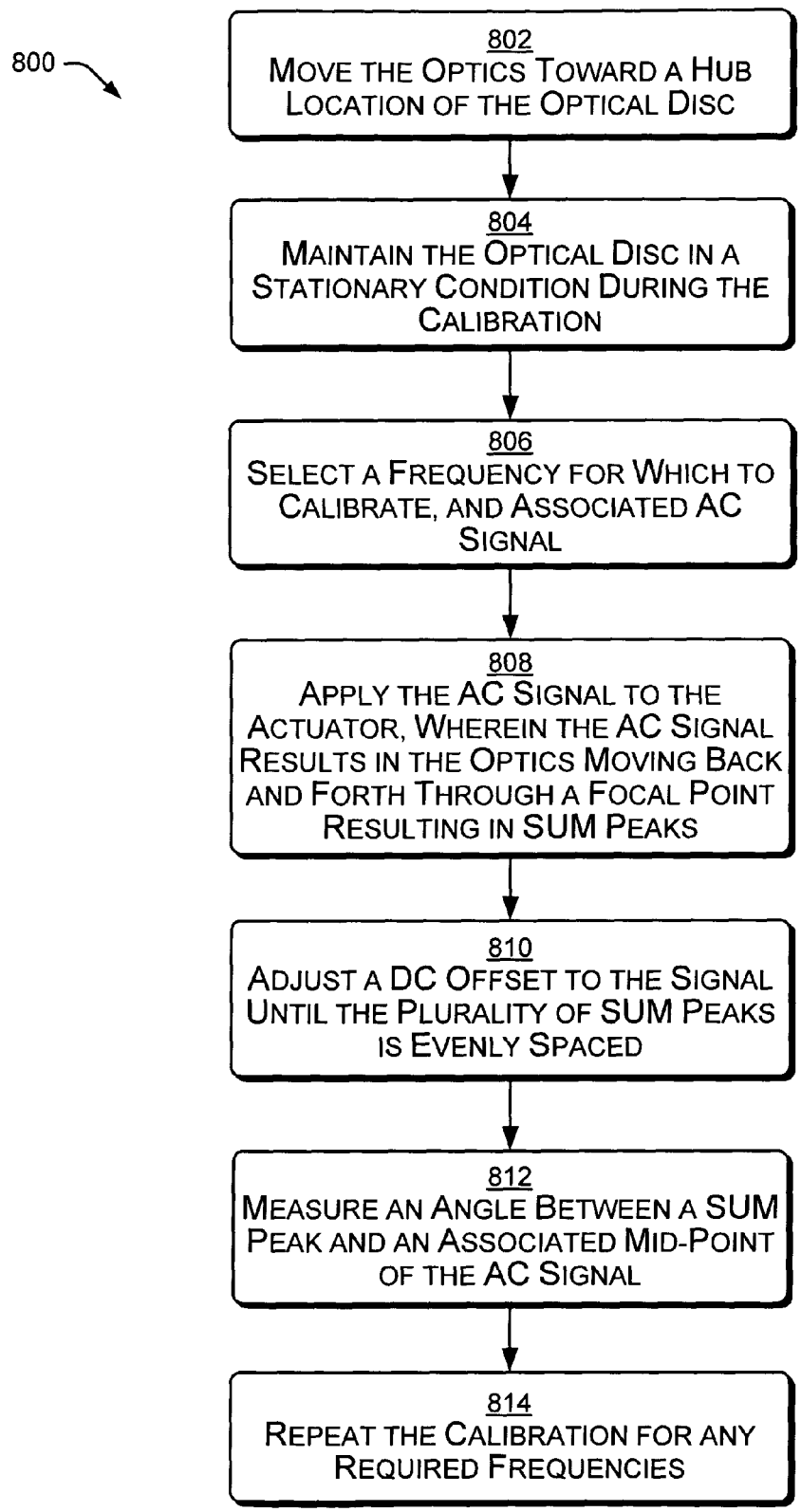
FIG. 8 is a flow chart illustrating a process for calibration procedure.

FIG. 8 shows an exemplary process 800 for calibration of an actuator 211 (FIG. 2). The calibration process determines a phase lag by which response by the actuator is delayed after application of an input voltage (or current). The process 800 should be considered in view of the illustrations and discussions of FIG. 3, wherein calibration of the actuator was previously discussed.

At block 802, the OPU assembly, and in particular the laser, optics and sensors, is moved to a location near the hub of the optical disc.

At block 804, in one embodiment, the optical disc is maintained a stationary condition during the calibration procedure. In general, rotation of the disc during the calibration process changes the position at which the optics is focusing (if the optics are focused at the disc, which is convenient), and thereby reduces the accuracy of the calibration.

At block 806, a particular frequency is chosen at which the actuator sweeps the optics back and forth through the focal point in a direction perpendicular to the surface of the optical disc. The frequency may be selected to be similar to the anticipated frequency of the actuator during use. The calibration that is performed results in calculation of a phase lag that is related to the chosen frequency of the AC signal.

At block 808, the AC signal at the chosen frequency is applied to the actuator. A DC component of the signal should be selected to result in the optic moving back and forth through the focal point. Accordingly, as the signal is applied, the actuator moves the optics back and forth through the focal point, where the focal point is indicated by the SUM signal peaks.

At block 810, the DC component to the actuator input signal is adjusted so that the SUM signal peaks are evenly spaced over 360 degrees. By evenly spacing the SUM signal peaks, we know that the SUM signal peaks result from voltage at a mid-point of the AC input signal to the actuator.

At block 812, a phase delay is calculated that is particular to the frequency of the AC signal. The phase delay may be calculated by looking at the SUM peaks, wherein the optics are in focus, and comparing the angular location of the SUM peaks to a voltage midpoint of the AC input signal.

At block 814, additional calibrations may be performed for any other frequencies such as those frequencies at which it is anticipated that the actuator may be driven.

Figure 9:
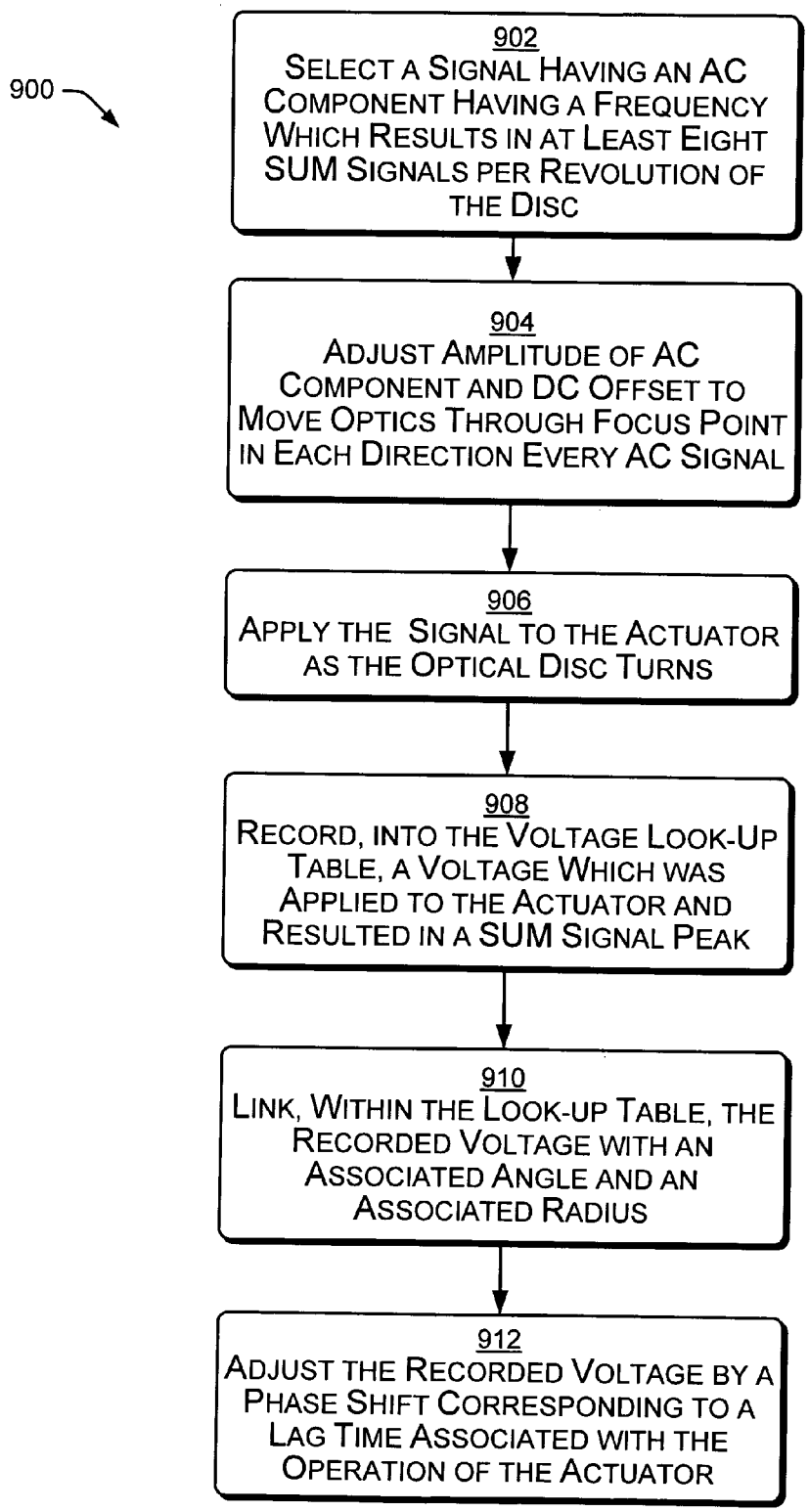
FIG. 9 is a flow chart illustrating measurement procedure.

FIG. 9 shows an exemplary process 900 for measurement of a specific optical disc. During the process 900, a data profile particular to the specific disc, may be configured. In different implementations, the data profile may be a voltage data look-up table 296 (FIG. 2) or a function 510 (FIG. 5) which is used to calculate a signal, such as a voltage or current level, for input to an actuator. Such a signal results in operation of the actuator consistent with movement of the optics to focus on the label region of the optical disc. Measurement may be performed for various locations of the label region of the optical disc. The greater the number of measurements that are determined, the more accurate the mapping of the contour of the surface of the optical disc. As will be seen, actuator control signals for areas between measured locations may be estimated by interpolation from locations wherein the signal which results in correct actuator performance, i.e. wherein the optics focuses on the label region, are known.

At block 902, a voltage input or signal to the actuator is selected such that its AC component has a frequency that results in the actuator moving the focal optics back and forth through the focal point at least eight times per every revolution (rotation) of the optical disc. The in focus positions are recognized by a photo sensor, such as the SUM signal, or by recognition of a pattern marked on the optical disc surface.

At block 904, the amplitude of the AC component and/or DC offset to the signal is adjusted to result in movement of the optics back and forth through the focus point according to the AC component.

At block 906, as the optical disc is turned, the input voltage or signal is applied to the actuator.

At block 908, a voltage which was applied to the actuator and which resulted in a SUM signal peak is recorded, such as into a look-up table. Alternately, the voltage which result in SUM signal peaks may be used to form a piece-wise continuous function, such as that seen in FIG. 5. The voltage levels may similarly be used to generate coefficients (such as for a Fourier series or a polynomial series) which can be used to generate any desired point along the continuous function. By generating any desired point along the function, or by consulting the voltage look-up table, a voltage level which puts the optics into focus at any location on the label surface of the optical disc may be obtain.

At block 910, where a look-up table is used, additional information is added to the look-up table that associates (links) the record voltage values, with an associated angle (sector) and radial position.

At block 912, the recorded voltage may be associated with a phase shift or lag time that corresponds with a lag time that is associated with the operation of the actuator. Accordingly, the voltage look-up table and/or function (e.g. the function of FIG. 5) may be altered to account for the phase shift. For example, the voltages of curve 422 (FIG. 4) may be used rather than the voltages of curve 418 (FIG. 4).

Figure 10:
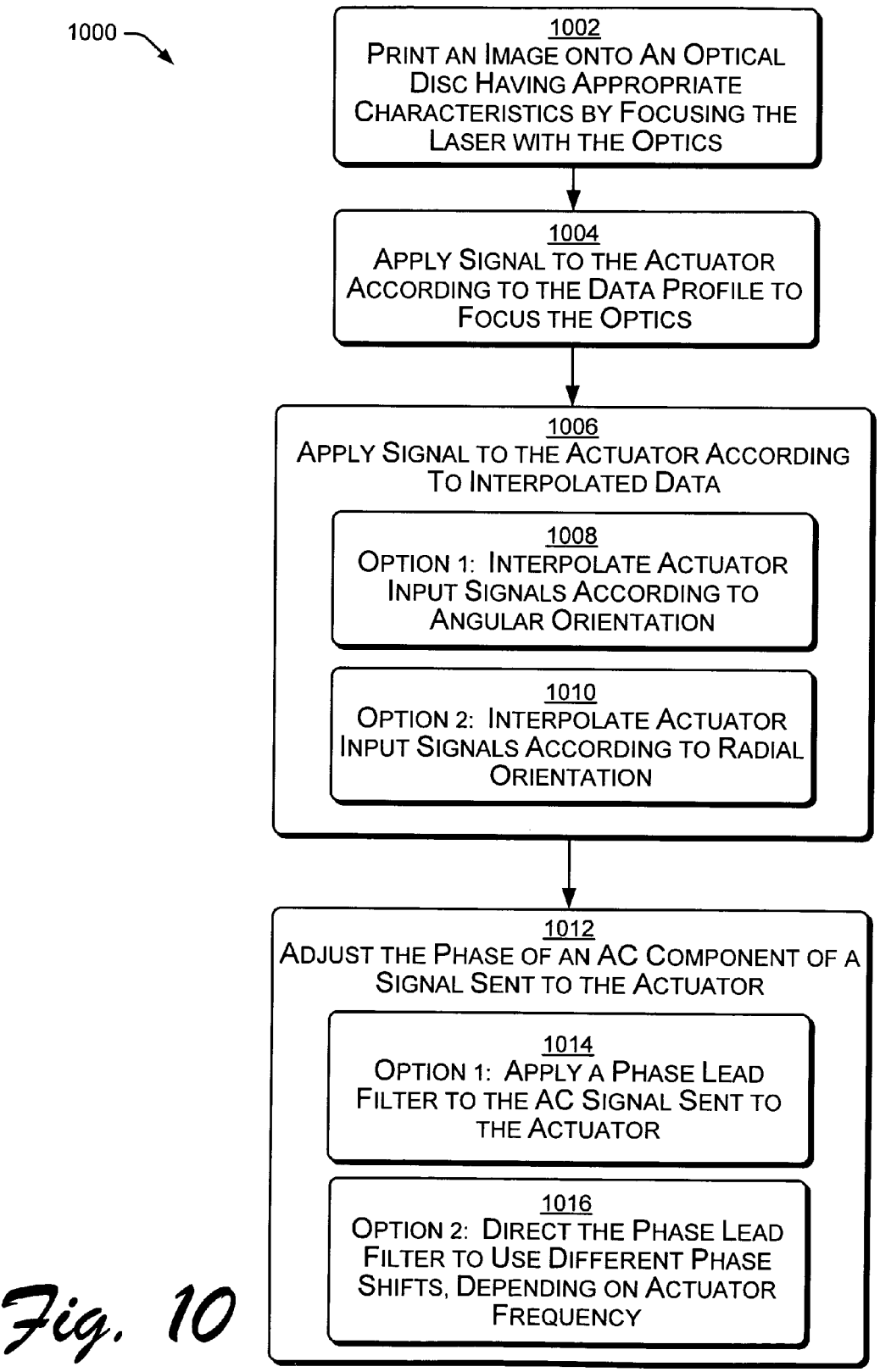
FIG. 10 is a flow chart illustrating a labeling procedure.

FIG. 10 shows an exemplary process 1000 for printing or marking a label side of an optical disc. Labeling may be performed using the disc media marking system shown in FIG. 1. Labeling is performed using data profile associated with the specific disc to be labeled, wherein the data profile was obtained by method 900, above. The data profile provides information needed to provide input to the.

At block 1002, printing of an image is performed within the label region of the optical disc. The printing may be performed by focusing a laser using the focal optics 220 on a photo sensitive material within the label region. The label region of the disc will have previously been measured to for creation of a data profile (e.g. a voltage data stored in a look-up table) to facilitate maintaining optical focus during the labeling process.

At block 1004, during the labeling process, the data profile, such as a voltage data look-up table 296, is continuously referred to for a signal for application to the actuator to move the optics into focus for each location on the optical disc.

At block 1006, in one embodiment, an interpolated signal value may be calculated for a given location within the label region using signal information related to adjacent location(s) on the label region. For example, optionally at block 1008, signal data associated with different disc sectors may be interpolated. Similarly, at block 1010, optionally, signal data associated with different radial distances may be interpolated. In all cases, interpolation may be done with first or higher order equations, such as linear approximations, spline curve fits, etc.

At block 1012, in an optional implementation, the phase of an AC component of a signal sent to the actuator is adjusted to compensate for a phase-lag in the response of the actuator. In a first option, at block 1014 the AC signal sent to the actuator is processed by a phase lead filter 245 (FIG. 2). The phase lead filter provides the actuator with a signal which will position the actuator while compensating for the phase lag of the actuator. In a second alternative, at block 1016 the phase lead filter is directed to filter for a variety of different actuator frequencies, depending on the frequency of the AC component to be input to the actuator.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable medium comprising processor-executable instructions for focusing optics, the processor-executable instructions comprising instructions for:
   generating a data profile, wherein the data profile is configured to provide signals for operation of an actuator, wherein the signals result in focus of the optics on a label region of an optical disc; and
   printing an image on the label region of the optical disc while focusing the optics by applying signals to the actuator according to the data profile;
      wherein generating the data profile comprises instructions for including data within the data profile associated with at least two radial distances from a center of the optical disc, wherein the data associated with each radial distance is phase-shifted according to a lag-time of the actuator at a frequency associated with printing a portion of the image on the label region of the optical disc located approximately at the radial distance.

2. A processor-readable medium as recited in claim 1, wherein generating the data profile comprises further instructions for:
   configuring a look-up table with signal data, wherein the signal data are associated with focusing on locations within the label region.

3. A processor-readable medium as recited in claim 1, wherein generating the data profile comprises further instructions for:
   configuring a function to generate signal data, wherein the function associates locations within the label region with appropriate signals.

4. A processor-readable medium as recited in claim 3, wherein configuring a function comprises further instructions for:
   generating coefficient data for a Fourier series.

5. A processor-readable medium as recited in claim 3, wherein configuring a function comprises further instructions for:
   generating coefficient data for a polynomial series.

6. A processor-readable medium as recited in claim 1, wherein the generating comprises further instructions for:
   applying an AC component of a signal to the actuator as the optical disc turns, wherein the AC component causes the optics to pass through a focal point in both directions on each cycle of the AC component; and
   recording a voltage into a voltage data look-up table which was applied to the actuator and which was associated with a SUM signal peak which resulted from the passage of the optics through the focal point.

7. A processor-readable medium as recited in claim 6 wherein the sum signal peak is determined by measuring sides of the sum signal peak and averaged.

8. A processor-readable medium as recited in claim 6, comprising additional instructions for adjusting the recorded voltage by a phase shift corresponding to a lag time associated with the operation of the actuator.

9. A processor-readable medium as recited in claim 6, comprising further instructions for:
   calibrating the actuator to determine an angle by which the actuator lags an input signal for at least one frequency; and
   adjusting the recorded voltage by the angle.

10. A processor-readable medium as recited in claim 6, wherein applying the AC component of the signal comprises instructions to repeat the AC signal at a frequency which results in at least eight SUM signal peaks per revolution of the optical disc.

11. A processor-readable medium as recited in claim 1, comprising further instructions for:
   indexing the data profile according to an angular orientation of the optical disc; and
   fetching data from the data profile according to the angular orientation of the optical disc during the printing of the image on the label region.

12. A processor-readable medium as recited in claim 1, wherein printing the image comprises further instructions for:
   interpolating between data in the data profile; and
   applying the interpolated values to the actuator wherein a specific data for the actuator is not prescribed by the data profile.

13. A processor-readable medium as recited in claim 1, wherein printing the image comprises further instructions for:
   interpolating between measured signals within the data profile using an at least first-order equation; and
   wherein the interpolating is a function of an angular orientation of the optical disc.

14. A processor-readable medium as recited in claim 1, wherein printing the image comprises further instructions for:
   interpolating between measured signals within the data profile using an at least first-order equation;
      wherein the interpolating is a function of a radial distance by which a focal point is from a center of the optical disc.

15. A processor-readable medium as recited in claim 1, wherein printing the image comprises further instructions for:
   interpolating voltage data between known levels within a voltage data look-up table using a second-order equation; and
   using the interpolated voltage data to control operation of the actuator wherein a specific voltage level for the actuator is not prescribed by the voltage look-up table.

16. A processor-readable medium as recited in claim 1, comprising instructions which configure the data profile as a piece-wise continuous function.

17. A processor-readable medium comprising processor-executable instructions for focusing optics, the processor-executable instructions comprising instructions for:
   generating a data profile, wherein the data profile is configured to provide signals for operation of an actuator, wherein the signals result in focus of the optics on a label region of an optical disc;
   printing an image on the label region of the optical disc while focusing the optics by applying signals to the actuator according to the data profile;
   calibrating the actuator to determine an angle by which the actuator lags an input signal for frequencies associated with printing the image at least two radial distances from a hub of the optical disc; and
   organizing the data profile according to the at least two radial distances and according to signals resulting in focus in a plurality of sectors of the optical disc.

18. A processor-readable medium as recited in claim 17, wherein calibrating the actuator comprises further instructions for:
   applying an AC signal to the actuator, wherein the AC signal results in the actuator moving the optics back and forth through a focal point causing a plurality of SUM signal peaks;
   adjusting a DC offset to the signal until the plurality of SUM signal peaks are evenly space; and
   measuring an angle between a SUM signal peak and an associated mid-point of the AC signal.

19. A processor-readable medium as recited in claim 18, wherein applying the AC component of the signal comprises instructions for applying a triangle wave to the actuator.

20. A processor-readable medium as recited in claim 17, comprising further instructions for:
   moving the optics toward a hub location of the optical disc; and
   maintaining the optical disc in a stationary condition during the calibrating.

21. A processor-readable medium comprising processor-executable instructions for focusing optics, the processor-executable instructions comprising instructions for:
   generating a data profile, wherein the data profile is configured to provide signals for operation of an actuator, wherein the signals result in focus of the optics on a label region of an optical disc;
   printing an image on the label region of the optical disc while focusing the optics by applying signals to the actuator according to the data profile; and
   configuring the data profile as a piece-wise continuous function, wherein the instructions which configure the piece-wise continuous function phase-shift the piece-wise continuous function by an angle associated with a lag time associated with the operation of the actuator.

22. A method for focusing optics, comprising;
   generating a data look-up table, wherein the data look-up table provides signal levels for operation of an actuator which result in focus of the optics on a plurality of locations within a label region of an optical disc;
   printing an image on the label region of the optical disc while focusing the optics by applying signals to the actuator according to the data look-up table;
   calibrating the actuator to determine an angle by which the actuator lags an input signal for at least one frequency; and
   adjusting the recorded signal by the angle.

23. A method as recited in claim 22, wherein the generating comprises:
   applying an AC component of a signal to the actuator as the optical disc turns, wherein the AC component causes the optics to pass through a focal point in both directions on each cycle of the AC component; and
   recording a signal into the data look-up table which was applied to the actuator and which was associated with a SUM signal peak which resulted from the passage of the optics through the focal point.

24. A method as recited in claim 23, wherein the sum signal peak is determined by measuring sides of the sum signal peak and averaged.

25. A method as recited in claim 22, additionally comprising adjusting the recorded signal by a phase shift corresponding to a lag time associated with the operation of the actuator.

26. A method for focusing optics, comprising:
   generating a data look-up table, wherein the data look-up table provides signal levels for operation of an actuator which result in focus of the optics on a plurality of locations within a label region of an optical disc;
   printing an image on the label region of the optical disc while focusing the optics by applying signals to the actuator according to the data look-up table; and
   calibrating the actuator to determine an angle by which the actuator lags an input signal for frequencies associated with printing the image at least two radial distances from a hub of the optical disc; and
   organizing the look-up table according to the at least two radial distances and according to signals resulting in focus in a plurality of sectors of the optical disc.

27. A method as recited in claim 26, wherein calibrating the actuator comprises:
   applying an AC signal to the actuator, wherein the AC signal results in the actuator moving the optics back and forth through a focal point causing a plurality of SUM signal peaks;
   adjusting a DC offset to the signal until the plurality of SUM signal peaks are evenly space; and
   measuring an angle between a SUM signal peak and an associated mid-point of the AC signal.

28. A method as recited in claim 26, wherein calibrating the actuator comprises:
applying an AC signal to the actuator, wherein the AC signal results in the actuator moving the optics back and forth through a focal point causing a multiple recognitions of a pattern marked on the optical disc;
adjusting a DC offset to the signal until the multiple recognitions are evenly space; and
measuring an angle between a time of a recognition and an associated mid-point of the AC signal.

29. A method for focusing optics, comprising:
generating a data look-up table, wherein the data look-up table provides signal levels for operation of an actuator which result in focus of the optics on a plurality of locations within a label region of an optical disc; and
printing an image on the label region of the optical disc while focusing the optics by applying signals to the actuator according to the data look-up table;
wherein generating the data look-up table comprises including data within the look-up table associated with at least two radial distances from a center of the optical disc, wherein the data associated with each radial distance is phase-shifted according to a lag-time of the actuator at a frequency associated with printing a portion of the image on the label region of the optical disc located approximately at the radial distance.

30. A method as recited in claim 29, further comprising:
indexing the data look-up table according to angular orientation of the optical disc; and
fetching data from the look-up table according to the angular orientation of the optical disc during the printing of the image on the label region.

31. A method as recited in claim 29, wherein the data look-up table is configured as a piece-wise continuous function.

32. A system for focusing optics, comprising:
logic configured for generating a data profile, wherein the profile is configured to provide signals for operation of an actuator, wherein the signals result in focus of the optics on a label region of an optical disc;
logic configured for printing an image on the label region of the optical disc while focusing the optics by applying signals to the actuator according to the data profile;
logic configured for calibrating the actuator to determine an angle by which the actuator lags an input signal for frequencies associated with printing the image at least two radial distances from a hub of the optical disc; and
logic configured for organizing a look-up table within the data profile according to the at least two radial distances and according to voltages resulting in focus in a plurality of sectors of the optical disc.

33. A system as recited in claim 32, wherein generating the data profile comprises:
logic configured for forming a look-up table with signal data, wherein the signal data are associated with focusing on a plurality of locations within the label region.

34. A system as recited in claim 32, wherein generating the data profile comprises:
logic for configuring generation of a function to produce signals, wherein the function associates locations within the label region with appropriate signals to result in focus on the locations.

35. A system as recited in claim 34, wherein the logic for configuring generation of the function comprises:
logic configured for generating coefficients for a Fourier series.

36. A system as recited in claim 34, wherein the logic for configuring generation of the function comprises:
logic configured for generating coefficients for a polynomial series.

37. A system as recited in claim 32, wherein the logic configured for generating a data profile comprises:
logic configured for applying an AC component of a signal to the actuator as the optical disc turns, wherein the AC component causes the optics to pass through a focal point in both directions on each cycle of the AC component; and
logic configured for recording a voltage into a voltage data look-up table which was applied to the actuator and which was associated with a SUM signal peak which resulted from the passage of the optics through the focal point.

38. A system as recited in claim 37, additionally comprising logic configured for adjusting the recorded voltage by a phase shift corresponding to a lag time associated with the operation of the actuator.

39. A system as recited in claim 37, wherein the logic configured for applying the AC component of the signal comprises logic configured for repeating the AC signal at a frequency which results in at least eight SUM signal peaks per revolution of the optical disc.

40. A system as recited in claim 32, wherein the logic configured for generating comprises:
logic configured for applying an AC component of a signal to the actuator as the optical disc turns, wherein the AC component causes the optics to pass through a focal point in both directions on each cycle of the AC component; and
logic configured for recording a voltage into a voltage data look-up table within the data profile, wherein the voltage was applied to the actuator and was associated with a recognition of a pattern on the optical disc which resulted from the passage of the optics through the focal point.

41. A system as recited in claim 32, wherein logic configured for calibrating the actuator comprises:
logic configured for applying an AC signal to the actuator, wherein the AC signal results in the actuator moving the optics back and forth through a focal point causing a plurality of SUM signal peaks;
logic configured for adjusting a DC offset to the signal until the plurality of SUM signal peaks are evenly space; and
logic configured for measuring an angle between a SUM signal peak and an associated mid-point of the AC signal.

42. A system as recited in claim 32, wherein logic configured for calibrating the actuator comprises:
logic configured for applying an AC signal to the actuator, wherein the AC signal results in the actuator moving the optics back and forth through a focal point causing multiple recognitions of a pattern on the optical disc;
logic configured for adjusting a DC offset to the signal until the recognitions are evenly space; and
logic configured for measunng an angle between a recognition and an associated mid-point of the AC signal.

43. A system as recited in claim 32, further comprising:
logic configured for moving the optics toward a hub location of the optical disc; and
logic configured for maintaining the optical disc in a stationary condition during the calibrating.

44. A system for focusing optics, comprising:
   logic configured for generating a data profile, wherein the profile is configured to provide signals for operation of an actuator, wherein the signals result in focus of the optics on a label region of an optical disc;
   logic configured for printing an image on the label region of the optical disc while focusing the optics by applying signals to the actuator according to the data profile;
   wherein the logic configured for generating the data profile comprises logic configured for including data within a look-up table within the data profile, wherein the data is associated with at least two radial distances from a center of the optical disc, and wherein the data associated with each radial distance is phase-shifted according to a lag-time of the actuator at a frequency associated with printing a portion of the image on the label region of the optical disc located approximately at one of the at least two radial distances.

45. A system as recited in claim 44, further comprising:
   logic configured for indexing a voltage data look-up table within the data profile according to angular orientation of the optical disc; and
   logic configured for fetching voltage data from the look-up table according to the angular orientation of the optical disc during the printing of the image on the label region.

46. A system as recited in claim 44, wherein the logic configured for printing the image comprises:
   logic configured for interpolating between voltage levels obtained from a voltage look-up table within the data profile; and
   logic configured for applying the interpolated values to the actuator wherein a specific voltage level for the actuator is not prescribed by the voltage look-up table.

47. A system as recited in claim 44, wherein the logic configured for printing the image further comprises:
   logic configured for interpolating between voltage levels in a voltage look-up table within the data profile using a first-order equation; and
   wherein the logic configured for the interpolating is a function of an angular orientation of the optical disc.

48. A system as recited in claim 44, wherein the logic configured for printing the image comprises:
   logic configured for interpolating signal data between known signals obtained from the data profile; and
   logic configured for using the interpolated signals to control operation of the actuator.

49. A system as recited in claim 44, additionally comprising logic configured for configuring the data profile as a piece-wise continuous function.

50. A system for focusing optics, comprising:
   logic configured for generating a data profile, wherein the profile is configured to provide signals for operation of an actuator, wherein the signals result in focus of the optics on a label region of an optical disc;
   logic configured for printing an image on the label region of the optical disc while focusing the optics by applying signals to the actuator according to the data profile; and
   logic configured for configuring the data profile as a piece-wise continuous function, wherein the logic configured for configuring the piece-wise continuous function phase-shifts the piece-wise continuous function by an angle associated with a lag time associated with the operation of the actuator.

51. An optical disc drive comprising:
   means for generating a data profile, wherein the data profile is configured to provide signals for operation of an actuator, wherein the signals result in focus of the optics on a label region of an optical disc;
   means for printing an image on the label region of the optical disc while focusing the optics by applying signals to the actuator according to the data profile; and
   means for calibrating the actuator to determine an angle by which the actuator lags an input signal for frequencies associated with printing the image at least two radial distances from a hub of the optical disc; and
   means for organizing the data profile according to the at least two radial distances and according to signals resulting in focus in a plurality of sectors of the optical disc.

52. An optical disc drive as recited in claim 51, wherein the means for generating the data profile further comprises:
   means for configuring a look-up table with signal data, wherein the signal data are associated with focusing on locations within the label region.

53. An optical disc drive as recited in claim 51 wherein the means for generating the data profile further comprises:
   means for configuring a function to generate signal data, wherein the function associates locations within the label region with appropriate signals.

54. An optical disc drive as recited in claim 51 wherein the means for generating the data profile further comprises:
   means for applying an AC component of a signal to the actuator as the optical disc turns, wherein the AC component causes the optics to pass through a focal point in both directions on each cycle of the AC component; and
   means for recording a voltage into a voltage data look-up table which was applied to the actuator and which was associated with a SUM signal peak which resulted from the passage of the optics through the focal point.

55. An optical disc drive comprising:
   means for generating a data profile, wherein the data profile is configured to provide signals for operation of an actuator, wherein the signals result in focus of the optics on a label region of an optical disc;
   means for printing an image on the label region of the optical disc while focusing the optics by applying signals to the actuator according to the data profile; and
   means for including data within the data profile associated with at least two radial distances from a center of the optical disc, wherein the data associated with each radial distance is phase-shifted according to a lag-time of the actuator at a frequency associated with printing a portion of the image on the label region of the optical disc located approximately at the radial distance.

56. An optical disc drive as recited in claim 55 further comprising:
   means for indexing the data profile according to an angular orientation of the optical disc; and
   means for fetching data from the data profile according to the angular orientation of the optical disc during the printing of the image on the label region.

57. An optical disc drive as recited in claim 55 wherein the means for printing further comprises:
   means for interpolating between data in the data profile; and
   means for applying the interpolated values to the actuator wherein a specific data for the actuator is not prescribed by the data profile.

58. An optical disc drive as recited in claim 55 wherein the means for printing further comprises:
    means for interpolating between measured signals within the data profile using an at least first-order equation; and wherein the means for interpolating is a function of an angular orientation of the optical disc.

* * * * *

UNITED STATES PATENT AND TRADEMARK OFFICE
CERTIFICATE OF CORRECTION

PATENT NO. : 7,084,894 B2 Page 1 of 1
APPLICATION NO. : 10/660991
DATED : August 1, 2006
INVENTOR(S) : Andrew L. Van Brocklin et al.

It is certified that error appears in the above-identified patent and that said Letters Patent is hereby corrected as shown below:

In column 14, line 37, in Claim 7, delete "sum" and insert -- SUM --, therefor.

In column 14, line 38, in Claim 7, delete "sum" and insert -- SUM --, therefor.

In column 16, line 13, in Claim 22, delete "comprising;" and insert -- comprising: --, therefor.

In column 16, line 35, in Claim 24, delete "sum" and insert -- SUM --, therefor.

In column 16, line 36, in Claim 24, delete "sum" and insert -- SUM --, therefor.

In column 18, line 61, in Claim 42, delete "measunng" and insert -- measuring --, therefor.

Signed and Sealed this

Twenty-second Day of June, 2010

David J. Kappos
*Director of the United States Patent and Trademark Office*